INVENTORS.
Gilbert C. Hermeling, Jr.
& Seymour Lynn
BY H. C. Newton
ATTORNEY

V. H. F. U. H. F.-TUNER SYSTEM

Filed March 9, 1955 2 Sheets-Sheet 2

INVENTORS.
Gilbert C. Hermeling, Jr.
& Seymour Lynn
BY H. O. Newton
ATTORNEY.

United States Patent Office 2,835,798

Patented May 20, 1958

2,835,798

V. H. F.-U. H. F.-TUNER SYSTEM

Gilbert C. Hermeling, Jr., and Seymour Lynn, Collingswood, N. J., assignors to Radio Corporation of America, a corporation of Delaware Application March 9, 1955, Serial No. 493,239

8 Claims. (Cl. 250—20)

Figure 1:
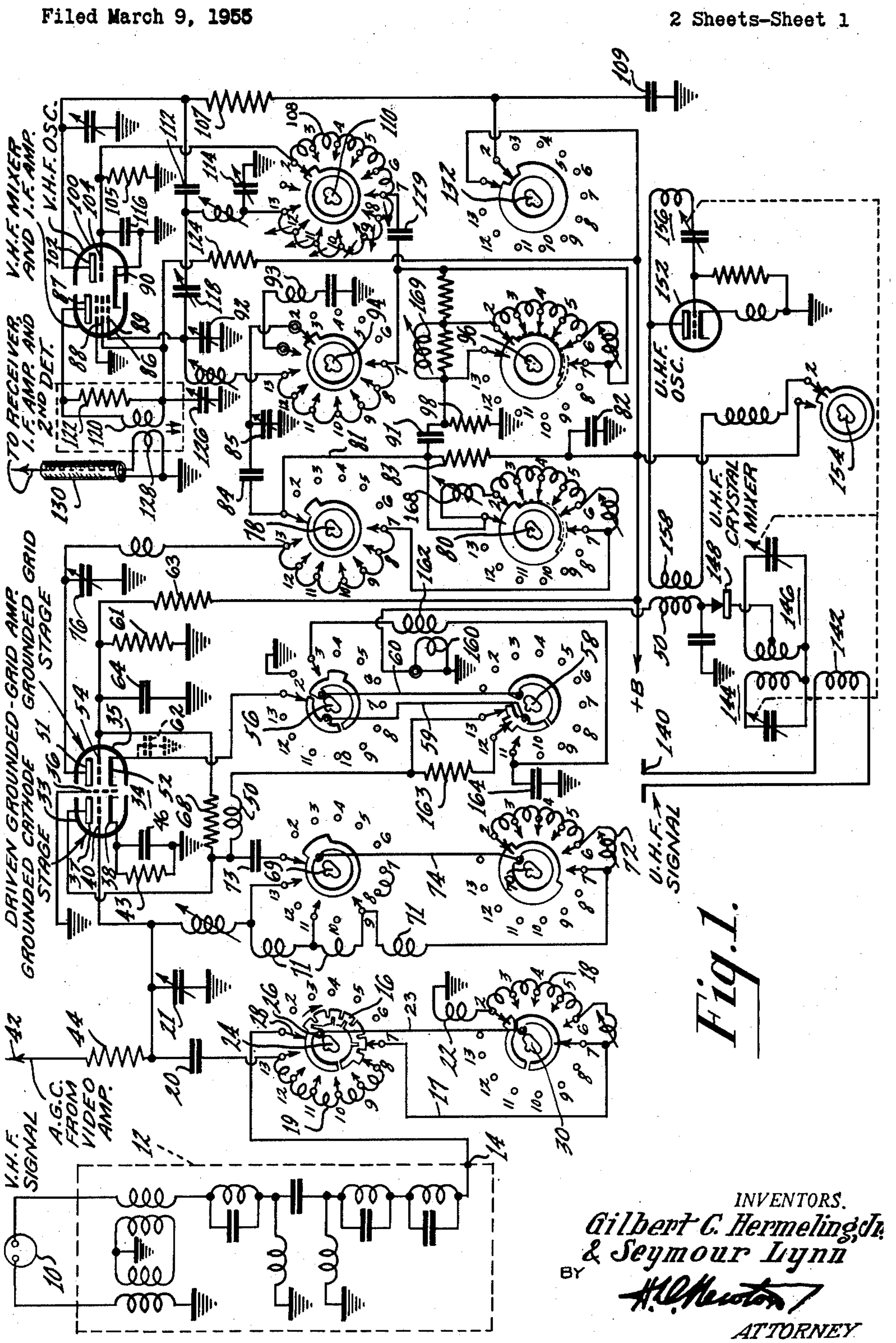

This invention relates to multi-band, high frequency signal receivers and more particularly relates to tuning systems for television receivers of the type adapted to receive both very high frequency (V. H. F.) and ultra high frequency (U. H. F.) television signals. Still more particularly the invention relates to a tuning system of the type which includes a V. H. F. tuner which is provided with a dual purpose signal translating stage which may be selectively adapted to operate as an R. F. amplifier for amplifying received V. H. F. television signals or as an intermediate frequency amplifier for intermediate frequency signals derived from a preceding U. H. F. converter. When adapted to operate as an intermediate frequency amplifier, the signal translating stage is connected in such a manner that variations of the band pass characteristics of the intermediate frequency amplifier are minimized with changes in tuning of the U. H. F. converter, changes in automatic gain control (AGC) potential and the like.

Under present standards, the broadcast television bands include channels 2 to 13 which occupy the frequency bands of 54 to 88 megacycles (mc.) and 174 to 216 mc. in the V. H. F. spectrum, and channels 14 to 83 in the U. H. F. spectrum which occupy the frequency band of 470 to 890 mc. It has been found difficult to provide a single tuner which is commercially adequate to cover all the television channels in both the V. H. F. and U. H. F. television broadcast spectra, and accordingly it is the present general practice to provide separate V. H. F. and U. H. F. tuners.

In general, the V. H. F. tuner includes in addition to the tuning or signal selection elements, a radio frequency (R. F.) amplifier for amplifying the received V. H. F. television signals, and mixer and oscillator stages for converting the amplified V. H. F. signals to corresponding intermediate frequency (I. F.) signals. The U. H. F. converter generally comprises in addition to the U. H. F. tuning or signal selection elements, a local oscillator and a crystal mixer for heterodyning the received U. H. F. signals into corresponding intermediate frequency signals. Since commercially satisfactory U. H. F. amplifier tubes are difficult to manufacture and are prohibitive in cost, no R. F. amplifier is provided for the U. H. F. converter. Hence, it is desirable to provide some intermediate frequency amplification of the converted U. H. F. signal prior to its being fed to the television receiver I. F. amplifier, so that the signal input to the television receiver I. F. amplifier is on the same order of magnitude for U. H. F. as for V. H. F.

To avoid the necessity and expense of providing a separate I. F. amplifier for the U. H. F. converter, it has been the practice to provide circuit connections for switching the V. H. F. R. F. amplifier and the V. H. F. mixer to operate as I. F. amplifiers during U. H. F. reception for amplifying the I. F. signal derived from the U. H. F. converter. A driven grounded-grid amplifier (a grounded cathode stage driving a grounded-grid stage) has generally been found to be one of the most economical forms of R. F. amplifiers for the V. H. F. tuner since it combines the low noise characteristics of a triode with the high gain and stability ordinarily associated with a pentode. When the driven grounded-grid amplifier is switched to operate as an I. F. amplifier for the converted U. H. F. television signals, it has been found that undesirable changes occur in the band-pass characteristic of the amplifier as the U. H. F. converter is tuned across its tuning range or as the AGC potentials change with received signal strength, etc.

Although these changes in pass-band characteristics are permissible in black and white television, they are undesirable in other applications as for example in color television reception.

It is accordingly a primary object of this invention to provide an improved television tuner for reception of V. H. F. television signals which is adapted for use as an intermediate frequency amplifier in connection with a preceding U. H. F. television converter wherein variations in pass-band characteristics of the television tuner when used as an I. F. amplifier are substantially reduced.

A further object of this invention is to provide an improved television tuner for V. H. F. television signals of the type incorporating a radio frequency amplifier comprising a driven grounded-grid stage, which is adapted for use as an intermediate frequency amplifier for intermediate frequency signals derived from a U. H. F. converter, wherein variations in the band-pass characteristics of the intermediate frequency amplifier with changes in AGC potential and changes in U. H. F. tuning and the like are minimized.

In accordance with this invention, a V. H. F. television tuner is provided with a dual purpose stage which operates as a driven grounded-grid R. F. amplifier for V. H. F. signals, and as an intermediate frequency amplifier for intermediate frequency signals derived from a preceding U. H. F. converter. The U. H. F. converter includes a crystal mixer which is coupled with the cathode of the grounded-grid stage and the grounded grid section of the driven grounded-grid amplifier operates as an I. F. amplifier for the converted U. H. F. signals. It has been found that when the crystal mixer works into a grounded grid stage, the response characteristics are substantially constant as the U. H. F. converter is tuned across the band or with AGC potential variations, etc. If desired, AGC voltage may be applied to the grounded cathode stage of the driven grounded-grid amplifier during U. H. F. reception to act as an AGC amplifier for controlling the gain of the grounded-grid stage since the two tubes have their space current paths connected in series.

Figure 2:
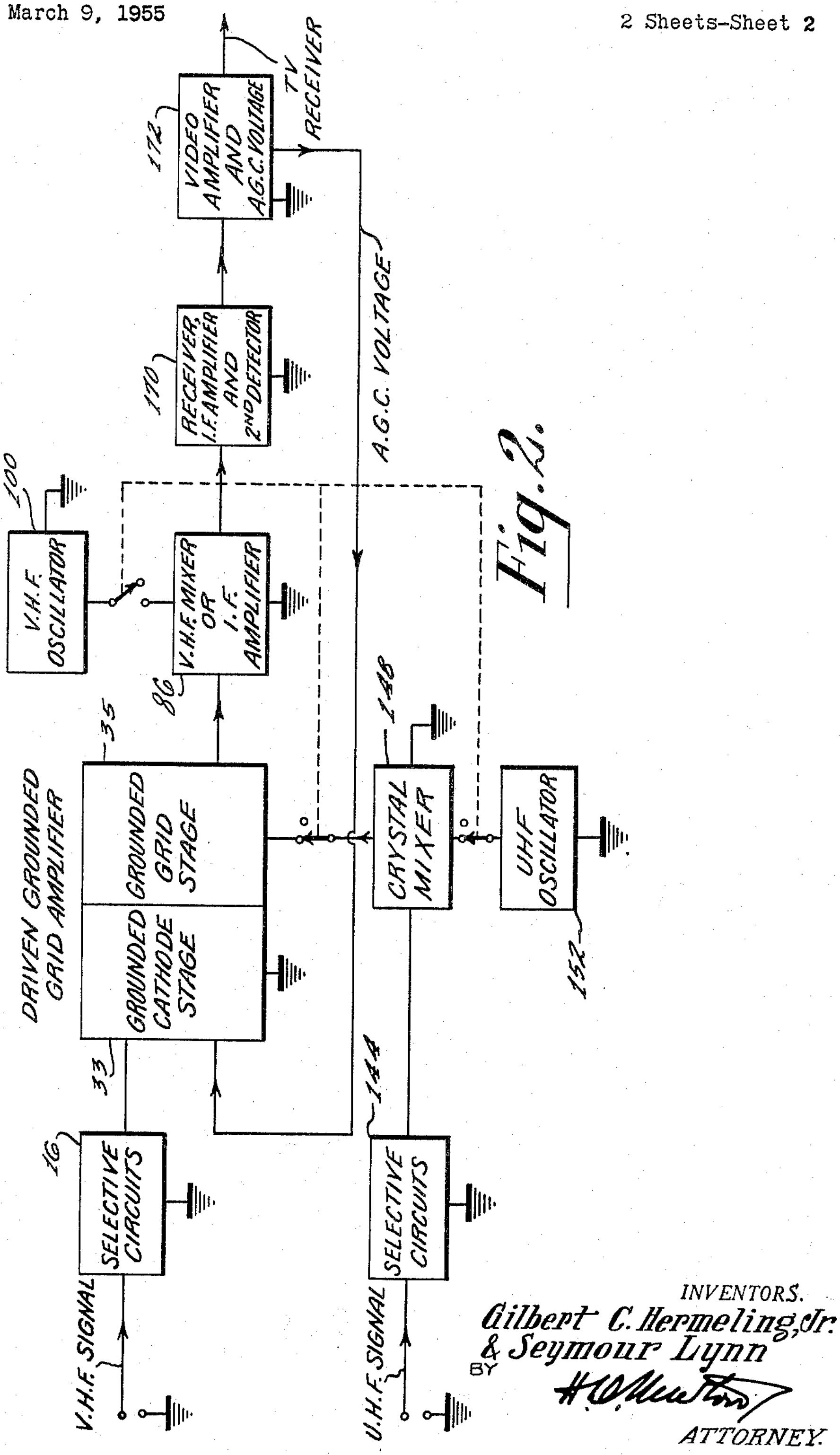

The novel features which are considered characteristic of this invention are set forth with particularity of the appended claims. The invention itself, however, both as to its organization and method of operation, as well as additional objects and advantages thereof, will best be understood from the following description when read in connection with the accompanying drawings in which:

Figure 1 is a schematic circuit diagram of a V. H. F.–U. H. F. television tuning system embodying the invention; and Figure 2 is a simplified block diagram of a portion of a television receiver embodying the tuning system of the invention as shown in Figure 1.

Referring now particularly to Figure 1 there is schematically illustrated a V. H. F.–U. H. F. tuning system for television receivers, or the like, which derives input signals from an antenna, or other signal source, connected to the input terminal board 10. Input signals passed through a matching transformer and suitable traps or interference attenuation circuits are found within the shielded compartment 12.

Thus, filtered input signals arriving at a terminal 14 feed into the V. H. F. signal selection circuits which include the tuning inductors 16 and 18 at the switch sections 24 and 30. The switch sections 24 and 30 are wafer switches having inductors between the contact terminals thereof, and are adapted for step by step switching in any of 13 different positions (12 V. H. F. positions and 1 U. H. F. position). The high frequency impedance is presented between the terminal 14 and ground by way of the conductor 23 and the inductor 22 and essentially comprises the impedance presented by the inductor 16. The inductance of the inductor 16 includes the inherent inductance of the slotted rotor of the switch section 24 and is used for tuning the high frequency channels 7 through 13, by changing the lengths of the slotted rotor presented between the coupling connection 26 and the switch contact 28.

For the lower frequency channels 2 to 6 the high frequency impedance network 16 is shorted out by the conductors 17 and 23, and the overall inductance is determined by the number of series inductors 18 connected in the low frequency network by the switch section 30. Throughout the discussion of this figure it is to be recognized that each of the switch sections is ganged for unicontrol operation throughout the television channels 2 to 13, and the rotor elements rotate in a clockwise direction as the channel numbers increase as indicated in connection with the arrow at the first mentioned switch section 24. The ganged switches are controlled by a channel selector control which has one position for each of the V. H. F. television channels and a single position for U. H. F. reception.

An inductor 19 on the switch section 24 operates to step up the input circuit impedance to match the impedance of a succeeding amplifier tube and is connected to the amplifier input circuit through a coupling capacitor 20. The signal input circuit which is connected to the control grid 40 therefore includes the variable inductances respectively presented by the inductor 19 and the inductance from the terminal 14 to ground in parallel with a tuning capacitor 21.

The R. F. amplifier for V. H. F. television signals comprises a driven grounded grid stage which includes a grounded cathode stage driving a grounded grid stage. The separate stages each include a separate triode tube 33 and 35 respectively which may be included in a single envelope 34, such as for example in a 6BQ7A, which also includes an internal shield 36 to aid in the isolation of the tubes.

The tube 33 which is connected as a grounded cathode amplifier includes an anode 37, a cathode 38 and a control grid 40. An AGC bias potential is connected with the control grid 40 from an AGC potential terminal 42 by way of a resistor 44. A cathode bias resistor 43 is connected between the cathode 38 and ground to provide additional bias for the tube 33. The cathode 38 is essentially grounded for signal frequencies by a signal bypass capacitor 46.

The tube 35 includes an anode 51, a cathode 52 and a control grid 54. Coupling is provided between the tubes 33 and 35 by an inductor 50 which is on the order of .15 microhenries and is connected between the anode 37 of the first triode tube 33 and the cathode 52 of the second triode tube 35, through the switch sections 56 and 58, and the conductors 59 and 60. The switch sections are so constructed that a direct connection is provided from the inductor 50 to the cathode 52 for all positions of the switch sections 56 and 58 except the U. H. F. position, which will be described thereinafter. The inductor 50 series resonates with the capacitance 62 which is on the order of 5 micro-microfarads, presented between the cathode 52 of the second triode and the ground. The capacitance 62 represents the input capacitance of the triode 35, and if desired, additional external capacitance may be provided to supplement the inherent input capacitance. The frequency of resonance of this series resonant circuit is preferably within the signal passband of the driven grounded grid amplifier, although the circuit is operable if the resonance occurs slightly above the band of frequencies to be amplified. For television receivers adapted to the present United States standards, it is found that optimum performance is obtained when the series resonant circuit is made resonant at the high end of the band, or about channel 13. The series resonant circuit is effective throughout a rather broad band of frequencies including the high band channels 7 to 13 because of the loading presented by the inherently low input impedance of the second triode section 35.

The triode 35 is connected to operate as a grounded grid amplifier, and to this end the grid 54 is maintained at signal ground potential by a capacitor 64 which offers low impedance to signal frequency currents. Grid bias is obtained for the grounded grid triode 35 from the junction of a pair of resistors 61 and 63 which form a voltage divider network between ground and the +B voltage supply terminal. The resistors 61 and 63 are proportioned so that the voltage on the grid 54 is on the order of one half the anode supply voltage of the triode 35. A grid return resistor 68 connects the grid 54 of the triode 35 effectively to its cathode 52 at the anode 37 of the grounded cathode triode 33, since the inductor 50 has negligible impedance for direct current voltages. This connection may be made directly at the cathode 52 if desired. However, for operation at high frequencies, output to input coupling should be kept as low as possible, and the most convenient connection circuit is chosen to provide best overall operation. The resistors 61 and 68 and the tube 33 form a second voltage divider network which has the effect of providing a remote cutoff characteristic for the driven grounded grid amplifier, which is obtained by proper selection of the voltage divider components. In the present amplifier the resistance values used for the resistors 61 and 63 are 1 megohm, and 100,000 ohms respectively. This circuit enables optimum R. F. amplifier operation without necessitating a high AGC voltage or producing cross modulation due to a sharp cutoff characteristic.

For ordinary applications a driven grounded grid amplifier of the type described above produces satisfactory operation, while using only a minimum of components, and does not require neutralization. This is because the grounded cathode stage has about unity gain, and therefore, the effects of the feedback through the anode to grid capacitance have only a minor effect on the operation of the amplifier. The minor effects are primarily due to changes in AGC potential with changes in signal strength which causes the amount of feedback through the grid-anode capacitance to change thereby producing a variation in the input admittance of the amplifier. This in turn detunes the input circuit thereby producing a variation in the band-pass characteristic of the amplifier. Although these effects are relatively minor, it has been found that for some applications such as for color television, it is preferable to eliminate any such detuning effects insofar as possible.

To this end a pair of switch sections 69 to 70 are provided which include the inductors 71 and 72 between the various switch contacts thereof. Varying portions of the inductors 71 and 72 are switched in series with the blocking capacitor 73 between the anode 37 and control grid 40 of the triode 33 for the different television channels. The magnitude of the inductance of the inductors is selected to resonate with the anode-grid capacitance of the tube 33 at the desired channel frequency. In the switch position shown (channel 2) all of the inductance of the inductors 71 and 72 is connected between the grid 40 and the anode 37 by way of the rotors of switch sections 69 and 70, and the conductor 74. As the signal frequency is increased portions of the inductors 71 and 72 are successively shorted out. The net effect of this circuit is to provide a conventional coil neutralization circuit for each television channel selected.

A tunable output circuit for the driven grounded grid amplifier is coupled to the anode 51 of the grounded grid stage 35. The output circuit comprises a capacitor 76 which is connected in parallel with the inductance from the anode 51 to ground as presented by the inductors connected between the contact terminals of a pair of switch sections 78 and 80. A capacitor 82 is provided to establish signal reference potential or ground at the lower end of the series combination of the anode inductances and of the load resistor 83. For tuning through the low frequency channels, the inductors on the switch section 78 are in series with the inductors on the switch section 80, and for high frequency operation the inductors on the switch section 80 are shorted out by the conductor 81.

The tunable output circuit of the driven grounded grid amplifier is coupled to a tunable input circuit for the V. H. F. mixer stage 86, by means of low side coupling including a coupling capacitor 85 which is common to both the output circuit of the driven grounded grid amplifier and the input circuit of the mixer. The low side of the inductor in the output circuit of the driven grounded grid amplifier is connected to the capacitor 85 through a D. C. blocking capacitor 84. Signals from the low frequency channels are connected from the output circuit to the capacitor 85 through the rotor of the switch 80 and the conductor 81 while signals from the high frequency channels are coupled through the rotor of the switch section 78 and the contact pin designated by the numeral 1 on the switch section 78.

The mixer 86 comprises a pentode tube which includes an anode 87, a suppressor grid, a screen grid 88, a control grid 89 and a cathode 90. A tunable input circuit is connected to the control grid 89 of the mixer 86 and includes a tuning capacitor 92 which is connected in parallel with the inductance from the control grid 89 to ground as presented by the inductors connected between the contact terminals of a pair of switch sections, 94 and 96. For the low frequency channels 2 to 6 the inductor on the switch section 94 is in series with the inductors on the switch section 96, and the D. C. circuit to ground is completed through the grid resistor 98. The signal circuit for low frequency channels is completed to ground through the blocking capacitor 91, the conductor 81, the capacitor 84, and the common coupling capacitor 85. The signal circuit for the high frequency channels 7 to 13 is completed to ground through a portion of the inductor on the switch section 94 and the common coupling capacitor 85. Coupling is obtained between the R. F. amplifier and mixer stages by the common circulating currents in the capacitor 85.

An oscillator tube 100 is provided which has an anode 102, a control grid 104 and a cathode 90. If desired, the oscillator tube may be in the same envelope as the mixer tube 86 as in a 6X8 type tube by way of example. The oscillator is a modified Colpitts type and provides a signal for heterodyning a received V. H. F. television signal to a corresponding intermediate signal before further amplification by the receiver intermediate frequency amplifier.

The oscillator tank circuit includes an inductor 108 which is positioned between the contact terminals of a switch section 110, and is connected between the anode 102 and the grid 104. A capacitor 112 is connected between the anode 101 and the inductor 108 to block a D. C. potential from the switch section 110 and also to permit a larger inductance to be put on the switch, since the effect of a series capacitance is equal and opposite to that of an inductance, and therefore additional inductance is required to overcome the effect of the capacitor. The inductor 108 resonates primarily with the capacitors 114 and 116. The capacitor 114 provides a fine tuning control of the oscillator frequency while the capacitor 116 supplements the inherent grid-cathode capacity of the oscillator tube 108.

A grid resistor 105 provides a D. C. return path from the grid 104 to the cathode 90. Operating potential is supplied to the anode 102 through a load resistor 107, and a capacitor 109 serves to bypass oscillator signals to ground, and keep the power supply from loading the oscillator.

A predetermined amount of oscillator injection from the oscillator tank circuit to the mixer input circuit is provided by the coupling capacitor 118 which is made adjustable to allow variation in the amount of injection. The oscillator signal energy conveyed to the mixer grid 89 is heterodyned with the V. H. F. signal in the mixer 86 to produce a corresponding difference or I. F. signal in an output circuit of the mixer. A second oscillator injection capacitor 119 is connected between the high signal potential side of the inductor on the switch section 96 in the mixer input circuit and a point on the oscillator tank inductor 108 to supplement the oscillator injection for the low frequency television channels.

The output circuit of the mixer 80 includes a primary winding 120 of an I. F. transformer which is connected between the anode 87 and screen grid 86 of the mixer. A resistor 122 is connected across the primary winding so that the circuit is relatively broadband. Operating potential for the anode and screen of the mixer tube 86 is supplied through the load resistor 124 from the +B supply. A signal bypass capacitor 126 is connected from the screen grid 86 to ground to provide a low impedance return circuit for signal frequency currents.

A secondary winding 128 of the I. F. transformer is mutually coupled with the primary winding 120. Intermediate frequency signals developed across the secondary winding 128 are conveyed through the transmission line 130 to the television receiver I. F. amplifier, not shown.

The circuits described thus far have been directed to the V. H. F. tuner and include those portions adapted to amplify and convert the received V. H. F. television signals to signals of the receiver I. F. When U. H. F. reception is desired the switch sections 24, 30, 56, 58, 69, 70, 78, 80, 94, 96, 110 and 132 which are ganged for uni-control operation, are rotated one step counterclockwise from the channel 2 position as shown, to the U. H. F. position. The +B anode operating potential is then removed from the V. H. F. oscillator 100 by the action of the switch section 132.

Referring now to the U. H. F. converter, an antenna 140 is connected by way of a twin conductor transmission line which has good performance characteristics through the U. H. F. band to an input coupling winding 142, which at U. H. F. may comprise an inductive loop. The signal selection system for the V. H. F. converter comprises the tunable circuits 144 and 146 which may comprise a pair of concentric transmission line tuners with variable capacity end loading by way of example.

A crystal mixer 148 is connected between a tap on the inductance portion of the tuned circuit 146 and a coupling winding 150. The tap position is selected so that the input impedance presented by the tuned circuit 146 substantially matches the impedance of the crystal mixer 148. A capacitor 149 is connected from the junction of the mixer 148 and the winding 150 to ground. The capacitor is selected to have low impedance to received U. H. F. signal or signals from the U. H. F. oscillator, but presents high impedance to signals at the I. F.

When the channel selector switch is rotated one position counter-clockwise, anode operating potential is supplied to the tube 152 through the switch section 154. The U. H. F. oscillator stage has a tunable tank circuit 156 which may comprise a concentric line with variable capacity end loading. Oscillator energy from the tank circuit 156 is coupled into the crystal mixer circuit by a winding 158 which is mutually coupled to the winding 150. The oscillator tank circuit 156 is ganged with the signal selection circuits 144 and 146 for simultaneous tuning.

The intermediate frequency output signal resulting from the heterodyning of a received U. H. F. signal and the U. H. F. oscillator signal is developed across the primary winding 160 of an amplifier input transformer, which is connected between the top side of the winding 150 and ground.

The primary winding 160 of the input transformer is mutually coupled to a secondary winding 162. One side of the secondary winding 162 is connected through the rotor of the switch section 56 to the cathode 52 of the grounded grid triode 35. The other side of the secondary winding 162 is connected through the rotor of the switch section 58 and a capacitor 164 which is a D. C. blocking capacitor to ground. A damping resistor 163 is inserted between the inductor 50 and the bottom of the secondary winding 162. The resistor 163 completes a direct current path from the anode 37 of the tube 35 to the cathode 52 of the tube 35, and also provides sufficient damping to prevent oscillation in the circuits of the tube 33. The secondary winding 162 is tuned by the input capacitance 62 of the grounded grid triode 35 to the intermediate frequency of the television receiver which in modern receivers is about 40 megacycles. However, the circuit is relatively broad band due to the inherently low input resistance of the grounded grid triode 35. Since the space current paths of the tubes 33 and 35 are connected in series, the tube 33 acts as an AGC amplifier for the tube 35.

The output circuit of the grounded grid amplifier 35 includes the inductors on the switch sections 78 and 80 in series with the inductor 168. This additional inductance together with the inductors on the switch sections 78 and 80 resonate with the capacitor 76 at the intermediate frequency. Likewise, in the input circuit of the V. H. F. mixer 80, an inductor 169 is connected in series with the inductors on the switch sections 94 and 96 to resonate with the capacitor 92 at the intermediate frequency.

To provide the necessary coupling between the output circuit of the grounded grid I. F. amplifier 35, and the input circuit of the pentode I. F. amplifier 80, an inductor 93 and a D. C. blocking capacitor are connected in series with the coupling capacitor 85 by the switch section 94. The common circulating current paths to ground for the input and output circuits then include the inductor 93 as well as the capacitor 85. Since the V. H. F. oscillator is deenergized in the U. H. F. position, the mixer 86 operates as a pentode I. F. amplifier during U. H. F. reception. The amplified I. F. signals are developed in the output circuit across the primary winding 120 of the intermediate frequency transformer, and conveyed to the television receiver I. F. amplifier as described above.

Referring now to Figure 2 along with Figure 1, the operation of the V. H. F.–U. H. F. tuning system of the invention will be discussed. For V. H. F. operation the V. H. F. signal selection circuits 16 are tuned to the frequency of the V. H. F. channel to be received. The grounded cathode stage 33 and grounded grid stage 35 operate as a driven grounded grid R. F. amplifier for the received V. H. F. signals. The output of the driven grounded grid amplifier is fed to the V. H. F. mixer 86 and heterodyned with a signal from the V. H. F. local oscillator 100 to produce a corresponding intermediate frequency. The intermediate frequency signals are then fed to the television receiver I. F. amplifier 170 for further amplification before being fed to the video amplifier and second detector 172. An AGC voltage derived from the second detector is fed to the input of the grounded cathode stage 33 to control the gain of the driven grounded grid amplifier in accordance with the received signal strength.

When U. H. F. operation is desired, the channel selector switch simultaneously deenergizes the V. H. F. oscillator 100, energizes the U. H. F. oscillator 152 and connects the output of the U. H. F. converter to the input circuit of the grounded grid stage 35. Figure 2 shows the tuning system in the U. H. F. position.

The U. H. F. signal section circuits 144 are tuned to the frequency of the desired U. H. F. television channel. The selected signal frequencies are heterodyned with signals from the U. H. F. local oscillator 152 in the crystal mixer 148 to produce a corresponding intermediate frequency. This I. F. signal is then fed to the grounded grid stage 35 which then serves as an I. F. amplifier. The crystal mixer 148 exhibits a relatively low impedance at the intermediate frequency. This impedance which may be represented by a capacitance in parallel with a resistance, changes as the converter circuits are tuned across the U. H. F. band, and also changes with variations in oscillator injection. Heretofore in television tuning systems of this type the crystal mixer 148 has been coupled to the input circuit of the grounded cathode stage 33. The input impedance of a grounded cathode stage is much higher than the impedance of the crystal, hence minor variations in the crystal impedance with U. H. F. tuning caused a relatively large variation in the band-pass characteristic of the amplifier. It is to be noted that the band-pass characteristic of the amplifier is a function of the resistance and capacitance.

In accordance with the invention the crystal mixer 148 is coupled with the grounded grid stage 35. The input impedance of the grounded grid stage 35 is lower than the I. F. impedance of the crystal mixer 148. Hence variations in the mixer impedance have a relatively smaller effect on the band-pass characteristics. In other words, with a grounded cathode amplifier, the loading by the crystal is more severe than the loading by the tube whereas with a grounded grid amplifier the loading by tube is more severe than the loading by the crystal, hence with the grounded grid stage, the changes in bandwidth due to changes in crystal impedance are much less.

The output of the grounded grid stage 35 is coupled to the input of the V. H. F. mixer stage 86 which is also connected to operate as an I. F. amplifier during U. H. F. reception. The amplifier intermediate frequency signals are then fed to the television receiver I. F. strip 170 for amplification in the same manner as previously described for converted V. H. F. signals.

AGC potentials derived from the second detector 172 are fed to the input of the grounded cathode stage 33 and controls the gain of the grounded grid stage since the space current paths of the two tubes are connected in series. Since the grounded cathode stage 33 operates as an AGC amplifier for the grounded grid stage 35, changes in the band-pass characteristic of the grounded grid stage when operating as an I. F. amplifier are substantially eliminated due to changes in AGC potential.

In accordance with the present invention, a V. H. F.–U. H. F. tuning system has been provided which includes a dual purpose signal translating stage which operates as a driven grounded grid amplifier for received V. H. F. television signals and as an intermediate frequency amplifier for intermediate frequency signals derived from a U. H. F. converter, wherein variations in band-pass characteristics of the intermediate frequency amplifier with changes in AGC potential and changes in tuning and the like are minimized.

What is claimed is:

1. A V. H. F.–U. H. F. television tuning system comprising a V. H. F. tuner including a dual purpose signal translating stage, said signal translating stage including a grounded cathode stage and a grounded-grid stage, means providing first circuit connections for causing said signal translating stage to operate as a driven grounded-grid amplifier for V. H. F. signals, means providing second circuit connections for causing said signal translating stage to operate as a grounded grid intermediate frequency amplifier for intermediate frequency signals to be derived from a preceding U. H. F. converter, said last named means including intermediate frequency signal input means connected with said grounded grid stage, and switch means for selectively establishing said first or second circuit connections.

2. A V. H. F.–U. H. F. television tuning system comprising in combination a V. H. F. tuner including a driven grounded grid amplifier for V. H. F. television signals, said amplifier comprises a grounded cathode stage and a grounded-grid stage, a U. H. F. converter including a crystal mixer for converting U. H. F. signals to corresponding intermediate frequency signals, and circuit connections for causing the grounded-grid stage of said driven grounded-grid amplifier to operate as an intermediate frequency amplifier for signals from said U. H. F. converter, said last named means including intermediate frequency signal input means for coupling said crystal mixer to said grounded grid stage.

3. In a multi-band receiver, a low frequency band tuner including a driven grounded grid signal amplifier, said amplifier comprising a grounded-cathode stage and a grounded-grid stage, circuit connections for causing the grounded-grid stage of said driven grounded-grid amplifier to operate as an intermediate frequency amplifier for signals of an intermediate frequency to be derived from a preceding high frequency converter, said circuit connections including intermediate frequency signal input means connected with said grounded grid stage, and switch means for selectively establishing said circuit connections for high frequency reception.

4. A V. H. F.–U. H. F. television tuning system comprising in combination a V. H. F. tuner including a first and second dual purpose signal translating stage, said first signal translating stage comprising a driven grounded grid amplifier having a grounded cathode stage and a grounded grid stage, a local oscillator for said V. H. F. tuner connected with said second signal translating stage, means providing a V. H. F. input circuit, first circuit connections selectively adapted to be connected between said V. H. F. input circuit and said grounded cathode stage and between said grounded grid stage and said second signal translating stage for causing said first signal translating stage to operate as a driven grounded grid amplifier for V. H. F. signals and causing said second signal translating stage to operate as a mixer for said V. H. F. signals to convert the V. H. F. signals into corresponding signals of an intermediate frequency, a U. H. F. converter including a crystal mixer for converting U. H. F. signals into corresponding signals of said intermediate frequency, second circuit connections adapted to be connected between said U. H. F. crystal mixer and said grounded grid stage, and between said grounded grid stage and said second signal translating stage for causing said grounded grid stage and said second signal translating stage to operate as intermediate frequency amplifiers, and switch means for selectively establishing said first and second connections in said tuner, means for disconnecting said local oscillator from said signal translating stage when said second circuit connections are established.

5. A V. H. F.–U. H. F. television tuning system comprising a V. H. F. tuner including a dual purpose signal translating stage, said signal translating stage including a grounded cathode stage and a grounded grid stage each having an electron tube with an anode, cathode and control electrode, means providing first connections including a V. H. F. input circuit connected with the control electrode of said grounded cathode stage for causing said signal translating stage to operate as a driven grounded-grid amplifier for V. H. F. signals, means providing second connections including an intermediate frequency input circuit connected with the cathode of said grounded grid amplifier for causing said signal translating stage to operate as a grounded grid amplifier for intermediate frequency signals to be derived from a preceding U. H. F. converter, and switch means for selectively establishing said first or second circuit connections.

6. A V. H. F.–U. H. F. television tuning system comprising a V. H. F. tuner including a dual purpose signal translating stage, said signal translating stage including a grounded cathode stage and a grounded grid stage each having an electron tube with an anode, cathode and control electrode, means providing first connections including a V. H. F. input circuit connected with the control electrode of said grounded cathode stage for causing said signal translating stage to operate as a driven grounded-grid amplifier for V. H. F signals, means providing second connections including an intermediate frequency input grounded-grid amplifier for V. H. F signals, a U. H. F. converter including a crystal mixer for converting U. H. F. signals to corresponding intermediate frequency signals, means providing second connections including an intermediate frequency input circuit connected between the cathode of said grounded grid amplifier and said U. H. F. converter for causing said signal translating stage to operate as a grounded grid amplifier for intermediate frequency signals derived from said U. H. F. converter and switch means for selectively establishing said first or second circuit connections.

7. A V. H. F.–U. H. F. television tuning system comprising a V. H. F. tuner including a dual purpose signal translating stage, said signal translating stage including a grounded cathode stage and a grounded grid stage each having an electron tube with an anode, cathode and control electrode, means providing a signal coupling impedance between the grounded cathode and grounded grid stages comprising an inductor connected between the anode of the grounded cathode stage and the cathode of the grounded grid stage, means providing first connections including a V. H. F. input circuit connected with the control electrode of said grounded cathode stage for causing said signal translating stage to operate as a driven grounded-grid amplifier for V. H. F. signals, a U. H. F. converter including a crystal mixer for converting U. H. F. signals to corresponding intermediate frequency signals, means providing second connections including an intermediate frequency input circuit connected between the cathode of said grounded grid amplifier and said U. H. F. converter for causing said signal translating stage to operate as a grounded grid intermediate frequency amplifier for intermediate frequency signals derived from said U. H. F. converter, and switch means for selectively establishing said first or second circuit connections.

8. A V. H. F.–U. H. F. television tuning system comprising a V. H. F tuner including a dual purpose signal translating stage, said signal translating stage including a grounded cathode stage and a grounded grid stage each having an electron tube with an anode, cathode and control electrode, means providing first circuit connections including a tunable V. H. F. input circuit having a variable tuning control connected to the control electrode of said grounded cathode stage, an interstage coupling circuit connected between the cathode of said grounded grid stage and the anode of said grounded cathode stage and a tunable output circuit having a variable tuning control connected to the anode of said grounded grid stage for connecting said signal translating stage to operate as a driven grounded grid amplifier for V. H. F. signals, a U. H. F. converter including a crystal mixer for converting U. H. F. signals to corresponding intermediate frequency signals, means providing second connections including an intermediate frequency input circuit connected between the cathode of said grounded grid amplifier and said U. H. F. converter and said tunable output circuit connected to the anode of said grounded grid amplifier for connecting said signal translating stage to operate as a grounded grid intermediate frequency amplifier for intermediate frequency signals to be derived from a preceding intermediate frequency signal derived from said U. H. F. converter and station selector switch means having a plurality of V. H. F. station selecting positions and a U. H. F. position connected with said variable tuning controls, said station selector switch means selectively establishes said first circuit connections in any of said V. H. F. station selecting positions and said second circuit connections in said U. H. F. position.

References Cited in the file of this patent

UNITED STATES PATENTS 2,665,377 Krepps ---------------- Jan. 5, 1954

FOREIGN PATENTS 156,590 Australia -------------- June 5, 1952

OTHER REFERENCES

RCA Review, vol. XIV, No. 3, September 1953, pp. 318–340, article by Murakami.